J. S. SUMMERS.
DEVICE FOR INSERTING BALLS IN TIRES.
APPLICATION FILED SEPT. 23, 1908.

912,917.

Patented Feb. 16, 1909.
2 SHEETS—SHEET 1.

Witnesses
F. L. Ourand.
M. K. Freeman.

Inventor
Joseph S. Summers
By Lewis Baggs
Attorneys

J. S. SUMMERS.
DEVICE FOR INSERTING BALLS IN TIRES.
APPLICATION FILED SEPT. 23, 1908.

912,917.

Patented Feb. 16, 1909.
2 SHEETS—SHEET 2.

Witnesses
F. L. Ourand.
M. K. Freeman.

Inventor
Joseph S. Summers
By Laurs Bagger &Co
his Attorneys

UNITED STATES PATENT OFFICE.

JOSEPH S. SUMMERS, OF ATLANTA, ILLINOIS, ASSIGNOR OF ONE-THIRD TO MILTON M. HOOSE, OF ATLANTA, ILLINOIS.

DEVICE FOR INSERTING BALLS IN TIRES.

No. 912,917.

Specification of Letters Patent.

Patented Feb. 16, 1909.

Application filed September 23, 1908. Serial No. 454,304.

*To all whom it may concern:*

Be it known that I, JOSEPH S. SUMMERS, a citizen of the United States, residing at Atlanta, in the county of Logan and State of Illinois, have invented certain new and useful Improvements in Devices for Inserting Balls in Tires, of which the following is a specification.

My invention relates to an improvement in a device for inserting inflated rubber balls into a rubber tire, and the object is to provide means whereby after the ball has been inserted into the tire it is prevented from coming out of the tire and another ball can be injected into the tire, and so on until the desired number of balls have been inserted into the tire.

The invention consists of many novel features of construction and combinations of parts which will be hereinafter fully described and pointed out in the claims.

Figure 1:
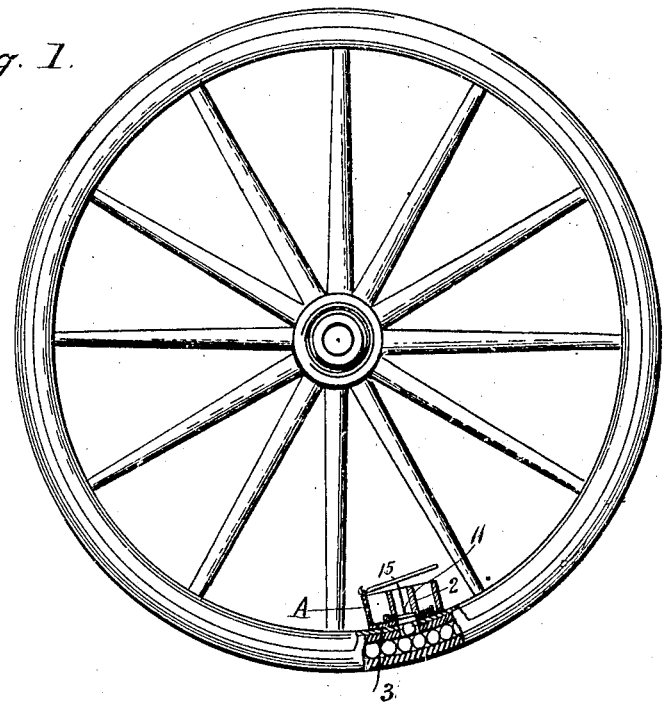
Figure 3:
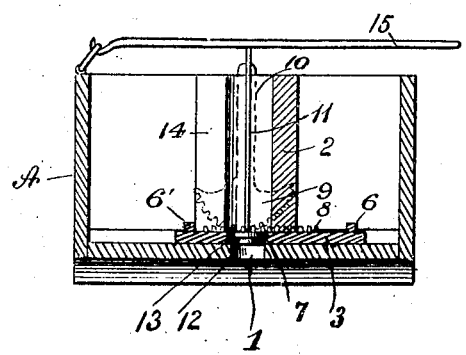
Figure 2:
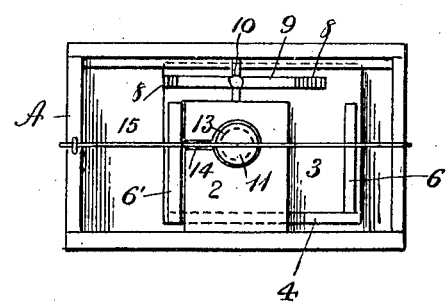
Figure 4:
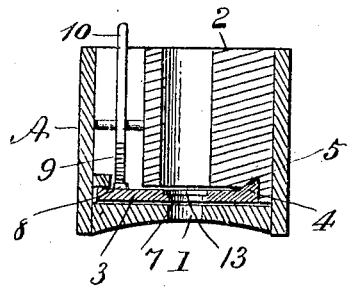
Figure 5:
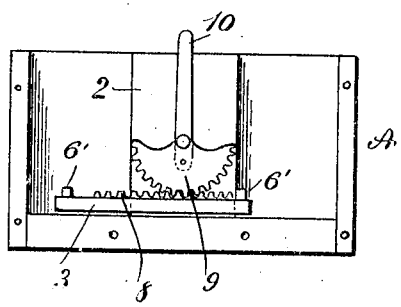
Figure 7:
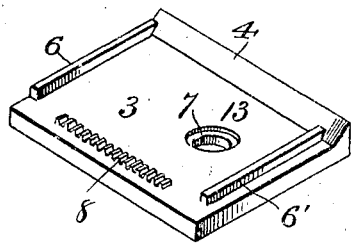
Figure 6:
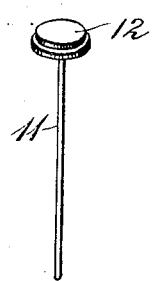

In the accompanying drawings:—Figure 1 is a view showing my invention applied to the felly of a wheel for injecting the balls into the tire; Fig. 2 is a top plan view with the cover removed; Fig. 3 is a longitudinal sectional view; Fig. 4 is a cross sectional view; Fig. 5 is a view of the interior with one side of the casing removed; Fig. 6 is a view of the plunger; and Fig. 7 is a view of the slide valve.

A represents the casing, which is curved on its under side to conform to the felly or rim of a wheel. An opening 1 is formed in the bottom of the casing, and mounted within the casing directly over the opening is a plunger cylinder 2. A slide valve 3 is received in the bottom of the casing and is adapted to slide beneath the cylinder 2. A guide 4 is formed on the slide valve, which travels in a groove 5 in the cylinder. Stops 6 and 6' are formed on the valve for limiting its movement in either direction. An opening 7 is formed at one end of the slide valve, which is adapted to be drawn into alinement with the opening 1 in the base or bottom of the casing and the opening in the plunger cylinder. When the slide is forced in one direction the stop 6' will cause the opening 7 to register with the opening in the cylinder and the opening 1 in the base, and when the slide is forced in the other direction the stop 6 will hold the slide so that the opening in the base and cylinder are closed. A rack 8 is formed on the slide 3 in which a segment 9, which is mounted on one side of the case, is adapted to engage the teeth of the rack, and connected to the segment is a lever 10 by which the segment is operated causing the valve to be moved in either direction. A plunger 11 is received in the cylinder 2, and formed at the lower end of the plunger is a disk 12. A seat 13 is formed in the slide valve 3 around the opening 7 formed in the slide valve. A vertical slot 14 is formed from the top to the bottom on one side of the cylinder of sufficient size to permit of the plunger being drawn through as the valve is operated for closing the opening in the bottom of the casing. A lever 15 is connected to the cylinder and is adapted to engage the plunger for forcing it downward through the cylinder to cause the ball in the cylinder to be injected or inserted into the tire.

After the ball has been forced into the tire and the plunger has traveled the length of the cylinder and into the slide valve, the segment is operated by the lever, causing the slide valve to be forced to one side of the casing closing the opening in the casing and preventing the ball which has been injected into the tire from coming out of the tire. After the valve has closed the opening 1 in the base another ball is inserted into the cylinder and the plunger is removed from the slide valve and inserted into the cylinder when the lever again forces the ball into the tire and the same operation is repeated until the desired number of balls have been injected into the tire.

The casing is applied to the felly or rim of a wheel and the balls are injected through the opening formed in the felly or rim of a tire and into the opening formed in a rubber tire. By injecting the balls into the tire a cushion tire is formed by the inflated rubber balls injected thereinto.

It is evident that more or less slight alterations might be made in the form and arrangement of the several parts described without departing from the spirit and scope of my invention, and hence I do not wish to be limited to the exact construction herein set forth, but:—

Having fully described my invention, what I claim as new and desire to secure by Letters Patent, is:—

1. A device for inserting balls in tires comprising a cylinder, a valve in engagement with the cylinder and a plunger for forcing the balls through the cylinder into the tire.

2. A device for inserting balls in tires comprising a cylinder, a slide valve in engagement with the cylinder, a plunger for injecting the balls into the tire through the cylinder and means for operating the slide valve.

3. A device for inserting balls in tires comprising a cylinder, a slide valve in engagement with the cylinder, having an opening therein which registers with the opening in the cylinder, a plunger for injecting the balls into the tire through the cylinder and means for operating the valve for closing the opening in the cylinder.

4. A device for inserting balls in tires comprising a cylinder having a slot formed at one side thereof, a slide valve in engagement with the cylinder and having an opening therein, which is adapted to register with the opening in the cylinder, a plunger for injecting the balls into the tire through the cylinder and adapted to be seated in the opening of the valve upon forcing the ball into the tire and means for operating the valve for closing the opening in the cylinder and carrying the plunger from the cylinder through the slotted opening.

5. A device for inserting balls in tires comprising a casing having an opening therein, a cylinder mounted in the casing over the opening, a slide valve received between the casing and the cylinder and provided with an opening which is adapted to register with the opening in the cylinder and casing, said cylinder having a slotted opening formed in one side thereof, a plunger received in the cylinder, means for operating the plunger for forcing the ball through the cylinder into the tire, said plunger being seated in the opening in the valve on its inner stroke and means for operating the valve for closing the opening in the casing and cylinder and carrying the plunger from the cylinder through the slotted opening.

In testimony whereof I affix my signature, in the presence of two witnesses.

JOSEPH S. SUMMERS.

Witnesses:
F. F. WEBER,
M. M. HOOSE.